(No Model.)
G. J. CONTANCIN, J. M. SCOTT & J. STUMPFF.
CORNSTALK CUTTER.
No. 281,025. Patented July 10, 1883.
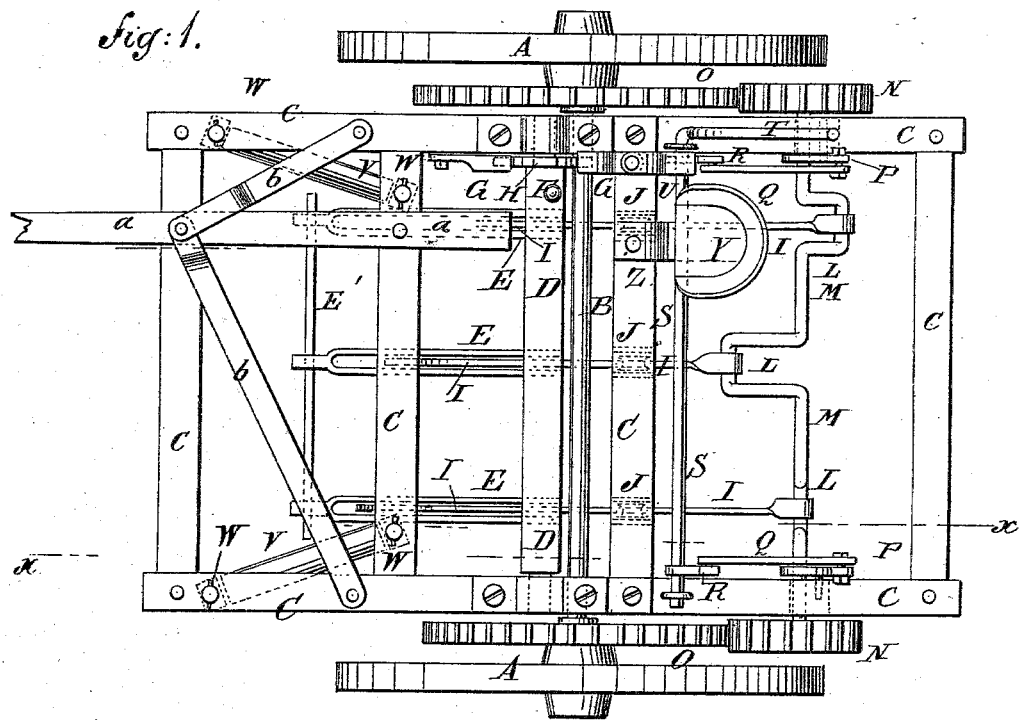
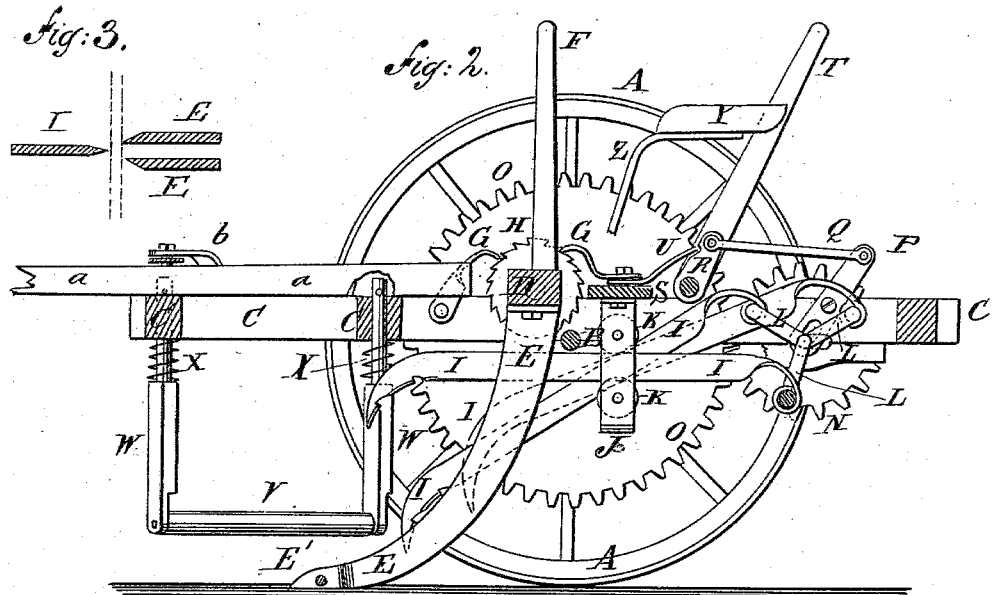
WITNESSES:
INVENTOR:
G. J. Contancin
J. M. Scott
J. Stumpff
BY
ATTORNEYS.

UNITED STATES PATENT OFFICE.

GUSTAVUS J. CONTANCIN, JAMES M. SCOTT, AND JOHN STUMPFF, OF BLUE MOUND, ILLINOIS.

CORNSTALK-CUTTER.

SPECIFICATION forming part of Letters Patent No. 281,025, dated July 10, 1883.

Application filed January 30, 1883. (No model.)

*To all whom it may concern:*

Be it known that we, GUSTAVUS JOHN CONTANCIN, JAMES MADISON SCOTT, and JOHN STUMPFF, all of Blue Mound, in the county of Macon and State of Illinois, have invented certain new and useful Improvements in Cornstalk-Cutters, of which the following is a full, clear, and exact description.

Reference is to be had to the accompanying drawings, forming a part of this specification, in which similar letters of reference indicate corresponding parts in all the figures.

Figure 1 is a plan view of our improvement. Fig. 2 is a sectional side elevation of the same, taken through the line $x\ x$, Fig. 1. Fig. 3 is a section of a knife and slotted finger, illustrating the operation of cutting a stalk.

The object of this invention is to cut cornstalks, while standing in the field, into such lengths that they will not interfere with the subsequent cultivation of the land.

The invention consists in a stalk-cutter constructed with a carriage, a set of curved and slotted fingers to support the stalks while being cut, a set of vibrating knives for cutting the stalks, and a crank-shaft and gearing for operating the knives. The knives pass through slotted guide-bars attached to the frame and provided with rollers above and below the said knives to guide and control the movements of the knives. The driving-gearing is thrown out of and into gear by means of a lever, connecting-rod, crank-arm, and hand-lever connected with the knife-operating crank-shaft. The curved fingers are attached to a rock-shaft which is provided with a lever for operating it and a ratchet-wheel and two pawls for holding it in position. The forward ends of the curved and slotted fingers are connected by a rod to distribute the strain upon the said fingers. The stalks are bent down upon the curved fingers by rollers pivoted to vertically-sliding bars, and held down by spiral springs, so that the said rollers can rise should they come in contact with the ground. The tongue is strengthened against side strain, and side draft in the machine is prevented by inclined braces attached to the tongue and the frame of the machine, as will be hereinafter fully described.

A are the wheels, the axle B of which revolves in bearings attached to the side bars of the frame C.

To the side bars of the frame C are pivoted the ends of a cross-bar, D, to the lower side of which are attached the upper ends of a number of fingers, E. The fingers E are designed to be about ten inches apart, and are slotted from their upper ends nearly to their lower ends. The fingers E are curved forward, and their lower ends are connected by a rod, E', to distribute the strain when the stalks are being cut.

To the bar D is attached a lever, F, for convenience in turning the said bar to raise the forward ends of the fingers E away from the ground, and to adjust them to work at any desired closeness to the ground. The fingers E are held in any position into which they may be adjusted by the two pawls G, attached to the frame C at the forward and rear sides of the bar D, and which engage with the teeth of the ratchet-wheel H, attached to the said bar D.

The stalks are cut by the knives I, which pass through the slots of the fingers E, and have their forward ends curved downward and their edges notched or serrated, so that the said knives will readily cut the stalks against the fingers E as the said knives are drawn to the rearward. The knives I pass through the slotted guide-bars J, the upper ends of which are attached to a cross-bar of the frame C.

Within the slot of each guide-bar J are pivoted two rollers, K, one above and the other below the knife I, the lower roller serving as a fulcrum to the knife and the upper roller holding the knife down to its work while cutting the stalks. The rear ends of the knives I are hinged to cranks L, formed upon the shaft M, and which project in different directions, so that the said knives will make their cuts separately, and thus distribute the strain. The crank-shaft M revolves in slotted bearings in the side bars of the frame C, and to its ends are attached gear-wheels N, the teeth of which mesh into the teeth of larger gear-wheels O, attached to the axle B, so that the knives I will be operated by the advance of the machine.

To the side bars of the frame C are pivoted levers P, the lower ends of which are perforated to receive the crank-shaft M, and to their upper ends are pivoted the rear ends of connecting-rods Q. The forward ends of the connecting-rods Q are pivoted to crank-arms R, formed upon or attached to the rod S, which rocks in bearings attached to the frame C.

To the rod S is attached, or upon it is formed, a lever, T, so that the gear-wheels N can be thrown into and out of gear with the gear-wheels O by operating the lever T. The gear-wheels N are held in gear with the gear-wheels O by a pawl, U, attached to a cross-bar of the frame C, and which engages with a notch in the crank-arm R, as shown in Figs. 1 and 2.

V are two rollers, the ends of which are pivoted to the lower ends of two bars or frames, W. The upper ends of the forward bars, W, or long tenons formed upon the said ends, pass up through holes in the forward parts of the side bars of the frame C, and the upper ends of the rear bars, W, pass up through holes in a cross-bar of the said frame C. By this construction the inclined rollers V, as the machine is drawn forward, bend down the stalks into such a position that they will be cut between the slotted fingers E and the knives I. The bars W are held down by spiral springs X, placed upon the upper parts of the said bars and interposed between the frame C and shoulders or other stops formed upon or attached to the said bars W, so that the rollers V, should they strike an obstruction, can rise and pass over it.

Y is the driver's seat, which is attached to the upper end of the standard Z. The lower end of the standard Z is attached to a cross-bar of the frame C in such a position that the driver, from his seat Y, can readily reach and operate the levers F T.

a is the tongue to which the draft is applied, and which is attached to the forward cross-bars of the frame C, near one side of the said frame. The tongue a is strengthened against side draft, and the machine is made to move forward squarely by the inclined braces b, the forward ends of which are attached to the said tongue a, and their rear ends are attached to the side bars of the frame C.

The machine can be arranged to cut one or two rows of stalks at a time, as may be desired.

With this construction, as the machine is drawn forward, the standing stalks will be bent down upon the fingers E and the down stalks will be raised by the said fingers E, so that all the stalks will be cut by the knives I as they are drawn back by the revolution of the crank-shaft M. With this construction, as the knives I move forward their forward ends are raised so as to pass above the stalks upon the fingers E, and as the said knives are drawn back their forward ends are lowered so as to come in contact with and cut the stalks upon the said fingers E, as illustrated in Fig. 2.

Having thus fully described our invention, we claim as new and desire to secure by Letters Patent—

1. In a cornstalk-cutter, the combination, with the knives I, adapted to have a forward and rearward oscillatory movement, of the forward-curved slotted fingers E and guide J, having the upper and lower rolls, K K, arranged to support the knives in a horizontal position during rearward movement and to limit their downward forward movement, substantially as and for the purpose set forth.

2. In a cornstalk-cutter, the combination, with the forward-curved slotted fingers E, with the forward ends adapted to rest on the ground, of the oscillatory knives I, with downward-curved forward ends adapted to move in the slots of said fingers, substantially as and for the purpose set forth.

3. In a cornstalk-cutter, the obliquely-arranged rollers V, supported in the lower ends of the sliding or yielding frames W, the upper ends of which are connected to the side bars and a cross-bar of the frame.

4. In a stalk-cutter, the combination, with the finger-carrying rock-shaft D and the frame C, of the ratchet-wheel H, the two pawls G, and the lever F, substantially as herein shown and described, whereby the fingers can be readily adjusted and will be held securely, as set forth.

GUSTAVUS JOHN CONTANCIN.
JAMES MADISON SCOTT.
JOHN STUMPFF.

Witnesses:
PHILIP CHAPPELL,
JOHN W. K. MCCLURE.